United States Patent [19]
Sekine

[11] Patent Number: 5,734,178
[45] Date of Patent: Mar. 31, 1998

[54] IMAGING SYSTEM USING AREA SENSOR

[75] Inventor: Hirokazu Sekine, Fujisawa, Japan

[73] Assignee: Kabushiki Kaisha Toshiba, Kanagawa-ken, Japan

[21] Appl. No.: 717,078

[22] Filed: Oct. 4, 1996

[30] Foreign Application Priority Data

Oct. 5, 1995 [JP] Japan ................... 7-258994

[51] Int. Cl.⁶ .................. H01L 31/062; H01L 31/113
[52] U.S. Cl. ................... 257/59; 257/443; 257/292; 257/294; 348/196; 348/551
[58] Field of Search ..................... 257/443, 448, 257/432, 291, 292, 294, 82, 59; 348/219, 322, 551, 196; 250/491.1

[56] References Cited

U.S. PATENT DOCUMENTS

| | | | |
|---|---|---|---|
| 4,245,240 | 1/1981 | Tanaka | 358/43 |
| 4,607,287 | 8/1986 | Endo et al. | 358/213 |
| 4,719,515 | 1/1988 | Miyagawa et al. | 358/268 |
| 5,561,460 | 10/1996 | Katoh | 348/219 |
| 5,608,226 | 3/1997 | Yamada et al. | 250/491.1 |

FOREIGN PATENT DOCUMENTS

| | | | |
|---|---|---|---|
| 4071217 | 3/1992 | Japan | 250/491.1 |
| 405312511 A | 11/1993 | Japan | |
| 406074724 A | 3/1994 | Japan | |

*Primary Examiner*—William Mintel
*Attorney, Agent, or Firm*—Finnegan, Henderson, Farabow, Garrett & Dunner, L.L.P.

[57] ABSTRACT

An imaging system using an area sensor in which reading of very fine object such as a manuscript, etc. is permitted to be carried out. This imaging system includes an area sensor in which a plurality of pixels are two-dimensionally arranged so that a pixel pitch in an X direction is an integer multiple A of a pixel width and a pixel pitch in a Y direction is an integer multiple B of a pixel length; object driving means for moving an object by the pixel width/length so that in a condition where one of the pixels corresponds to a part of an object, an image of a unit of 1/AB of the part of the object is formed on one of the pixels; and photoelectric conversion control means for allowing the area sensor to carry out photoelectric conversion in a manner synchronized with movement of the object. The system preferably further includes an optical system for carrying out enlargement or contraction adapted to form an image of the unit of 1/AB of the part of the object on the pixel and picture synthesizing means for AB numbered synthesizing image pick-up signals to obtain an image pick-up pattern of the entirety of the object.

3 Claims, 4 Drawing Sheets

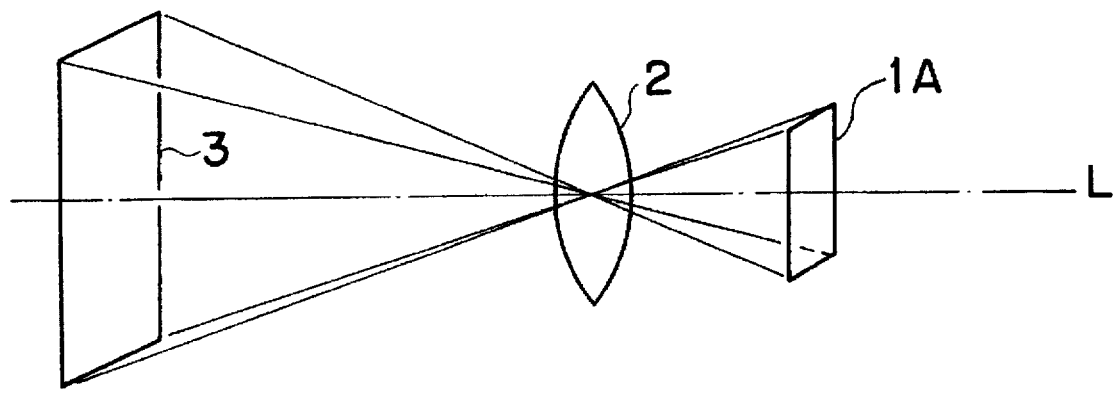
F I G. 5
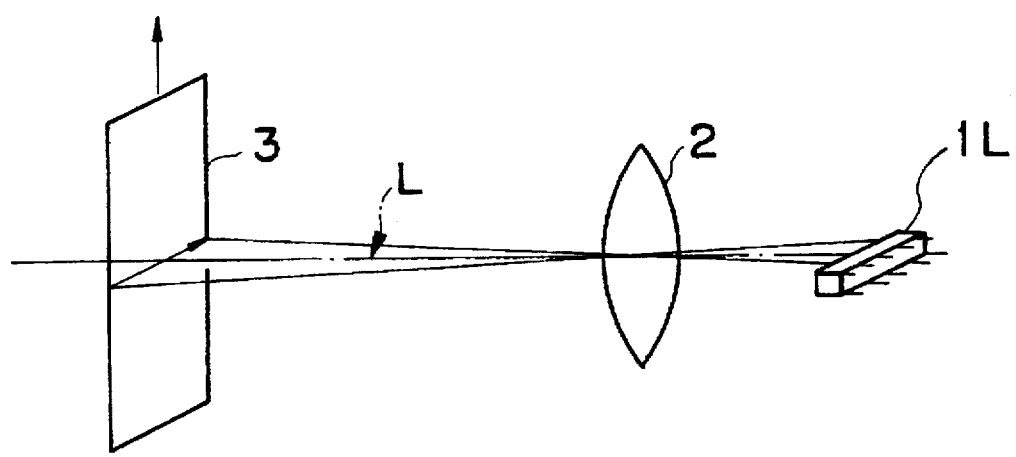
F I G. 6

IMAGING SYSTEM USING AREA SENSOR

BACKGROUND OF THE INVENTION

This invention relates to an imaging (image pick-up) system for forming an image of a manuscript on a solid-state imaging (image pick-up) device such as an area sensor, etc. in which plural pixels are two-dimensionally arranged to pick up that image, and more particularly to an imaging system suitable when used to read a manuscript with high resolution. An outline of a conventional imaging system for reading a manuscript in which an area sensor is used as the solid-state imaging (image pick-up) device is shown in FIG. 5. In this imaging device, an image of a manuscript 3, which is an object, is formed on area sensor 1A to pick up picture information of the manuscript 3 by the area sensor 1A to carry out a read-out operation. Ordinarily, A4 size (length× breadth=298 mm×210 mm) is most often used. Moreover, an outline of another conventional imaging system for reading a manuscript is shown in FIG. 6. In the imaging system shown, a linear sensor 1L in which pixels are one-dimensionally arranged, is used in place of the area sensor. The entire surface of the manuscript 3 is read by one line while positionally shifting (moving) the manuscript 3. The principle thereof is applied to facsimile or electronic copy machines, etc. The problems with an imaging (image pick-up) system using the area sensor shown in FIG. 5 are described below. When the manuscript size is assumed to be A4, the number of pixels required in reading a manuscript of this size at a resolution of 8 bits/mm is as follows:

Length . . . 8×298=2,384 pixels

Breadth . . . 8×210=1,680 pixels

Accordingly, the total number of pixels needed in a two-dimensional solid-state imaging device (hereinafter abbreviated as area sensor) is approx. 4,000,000. The number of pixels of such an area sensor is about ten times greater than that of movie sensors currently on the market, and is about 2–10 times the number of pixels in sensors used for broadcasting. There are, however sensors having this pixel density that are used for astronomic observation, artificial satellite, etc. Therefore, it is impossible to assemble an imaging system which can be prepared at low cost.

On the other hand, the existing area sensor for a video camera has 300,000–400,000 pixels and only has a resolution of about 2.2–2.5 dots/mm. Accordingly, such an area sensor is insufficient for reading a fine or extremely fine manuscript. At present, CCD area sensors having 1,300,000–2,000,000 pixels for HDTV (High Definition Television) are being developed. However, they are at an early stage of development, and the cost is also high. Moreover, even if such sensors are used, the resolution is on the order of 5–6 dots/mm. This resolution cannot reach the resolution of 8–12 dots/mm necessary for facsimile, etc.

Further, in the imaging system for reading manuscripts shown in FIG. 6, if the number of pixels of the linear sensor is approx. 1700 pixels in the case of the A4 size, approx. 2000 pixels in the case of the B4 size, and approx. 2400 pixels in the case of the A3 size, it is possible to read the manuscript at the resolution of 8 dots/mm. However, in this system, there is the problem that feeding of the manuscript must be mechanically carried out, so the process of reading the manuscript takes a long time. In addition, it is necessary to feed mechanically the manuscript accurately only by the outer dimensions of the manuscripts. As a result, the volume of the system becomes large, and an expensive manuscript feeding unit having good accuracy is required.

SUMMARY OF THE INVENTION

An object of this invention is to provide an imaging system in which relatively inexpensive area sensors used in movie camera are used, thus making it possible to read an extremely fine object in a short time.

To achieve the above-mentioned objects, in accordance with this invention, there is provided an imaging system comprising an area sensor in which a plurality of pixels are two-dimensionally arranged so that a pixel pitch in an X direction is an integer multiple A of a pixel width and a pixel pitch in a Y direction is an integer multiple B of a pixel length; object driving means for moving an object by the pixel width/length so that in a condition where one of the pixels corresponds to a part of an object, an image of a unit of 1/AB of the part of the object is formed on one of the pixels; photoelectric conversion control means for allowing the area sensor to carry out photoelectric conversion in a manner synchronized with movement of the object.

According to the present invention, an imaging system in which the manuscript is moved to thereby take thereinto, several times, picture information at different points of the manuscript surface by the area sensor so that the resolution is improved.

The system preferably further comprises an optical system for carrying out enlargement or contraction adapted to form an image of the unit of 1/AB of the part of the object on the pixel.

The system preferably further comprises picture synthesizing means for AB numbered synthesizing image pick-up signals to obtain an image pick-up pattern of the entirety of the object.

BRIEF DESCRIPTION OF THE DRAWINGS

In the accompanying drawings:

FIG. 5 is a model view showing the outline of a conventional imaging system for reading a manuscript; and FIG. 6 is a model view showing the outline of another conventional imaging system for reading a manuscript.

DESCRIPTION OF THE PREFERRED EMBODIMENTS

A preferred embodiment of this invention will now be described with reference to FIGS. 1 to 4.

Figure 1:
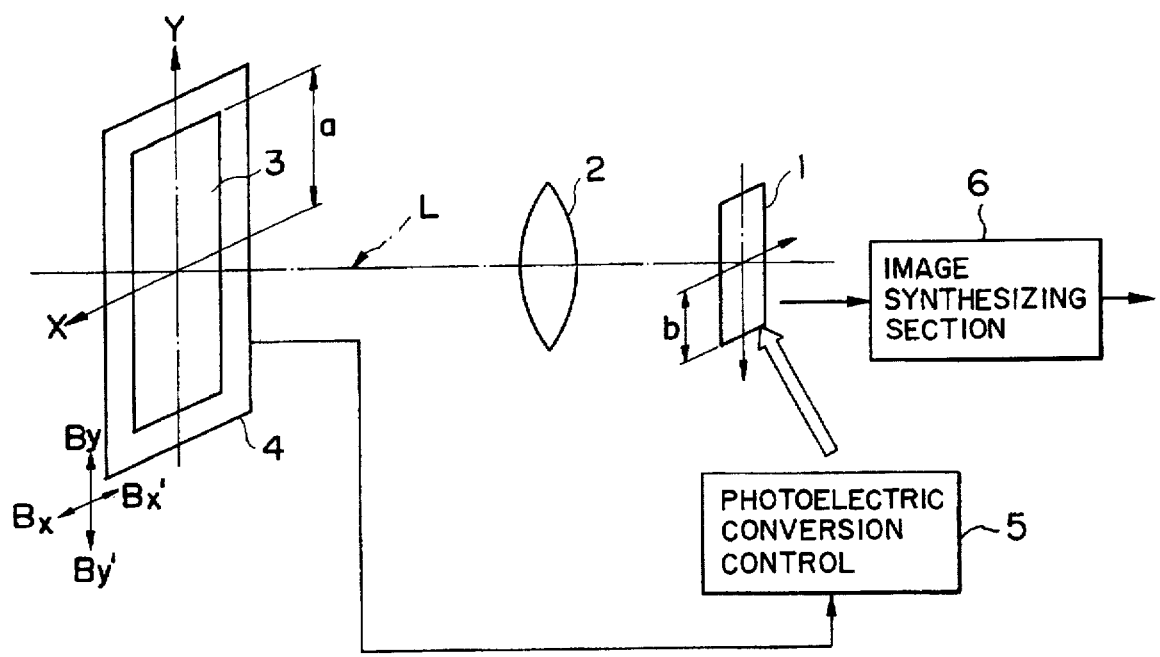
FIG. 1 is a model view showing outline of an imaging system using an area sensor according to an embodiment of this invention.

FIG. 1 is a view for explaining the embodiment of an imaging system for reading a manuscript to which this invention is applied. The imaging system of the embodiment shown in this figure differs from the conventional imaging system shown in FIG. 5 in that the imaging system of this embodiment illustrated in FIG. 1 comprises a manuscript driving mechanism 4, a photoelectric conversion control unit 5 and an image synthesizing section 6 which synthesizes images at each movement to obtain an overall image of the manuscript.

The manuscript drive mechanism 4 moves manuscript 3 in the X, Y directions within a plane perpendicular to the light axis L. The photoelectric conversion control unit 5 serves to allow the area sensor 1 to carry out photoelectric conversion in a manner synchronized with the movement. When a is one half of the dimension in the length direction of the manuscript, and b is one half of the dimension in the length direction of the area sensor, a magnification factor C by the lens is defined by C=a/b.

Figure 2:
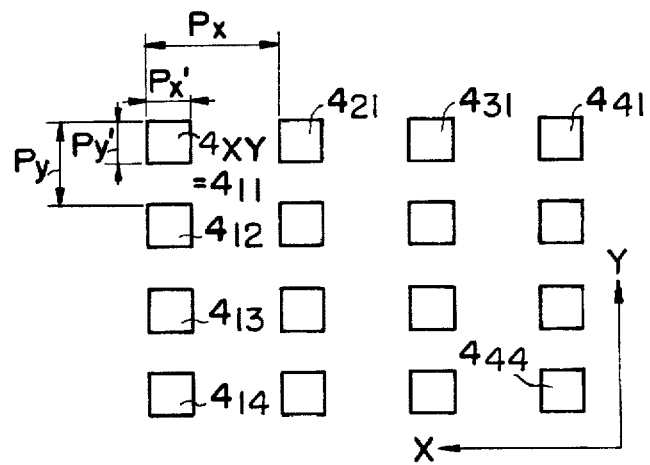
FIG. 2 is a model view showing the pixel structure of the area sensor shown in FIG. 1.

The pixel arrangement structure of the area sensor 1 is shown in FIG. 2. Pixels $4_{11}$, $4_{21}$, $4_{31}$, . . . , $4_{mn}$ are arranged in lattice form. In the figure, Px, Py respectively indicate pixel pitches in the X and Y directions. Moreover, dimensions in the X, Y directions of the size of the photoelectric conversion unit of pixels (opening size of a light shielding film) are respectively indicated by Px' and Py'. In this invention, the pixel pitches Px, Py are assumed to be respectively substantially multiple of opening sizes Px', Py'. In FIG. 2, the case as expressed below is indicated:

$Px=3Px', Py=2Py'$

Generally, there are relations $Px=APx', Py=BPy'$ where A and B are integers.

Figure 3:
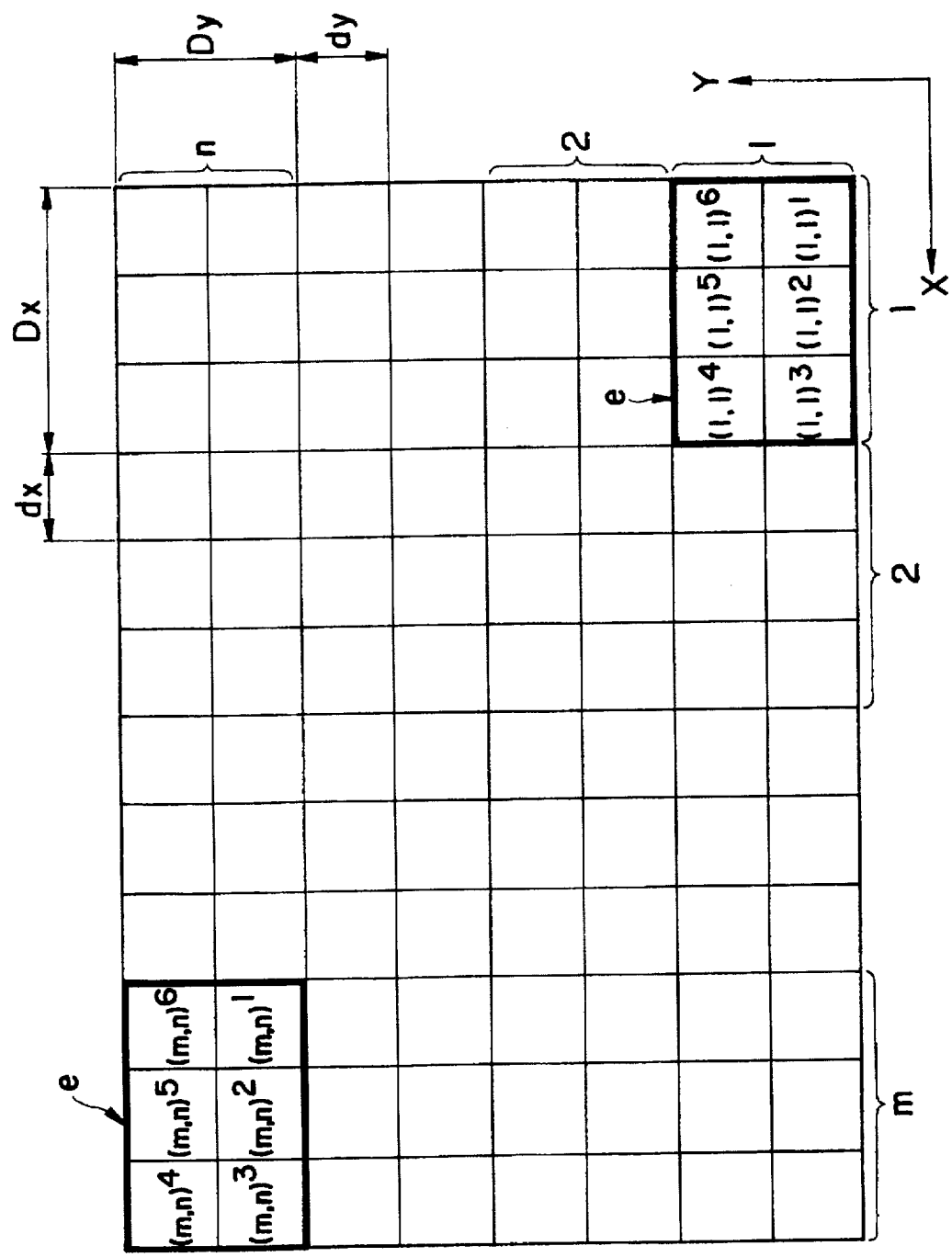
FIG. 3 is a model view showing the structure of the imaged area of a manuscript which serves as the object of the area sensor shown in FIG. 1.

Positions corresponding to respective pixels of the manuscript 3 that the area sensor 1 reads in the imaging system of this invention are shown in FIG. 3. Respective cells e partitioned by a mesh of 3dx in the X-direction and 2dy in the Y-direction are units for picking up images at respective pixels of the area sensor 1. An image of the manuscript 3 is optically formed on the area sensor 1 in one sixth of the units of the manuscript, and that image is picked up. 3×2 of the image pick-up unit on the manuscript is assumed to be one block (cell) e. As shown in the figure, image pick-up units within block (1, 1) are represented in a manner of $(1, 1)^1$, $(1, 1)^2$, $(1, 1)^3$, $(1, 1)^4$, $(1, 1)^5$, $(1, 1)^6$, and symbols are attached to respective image pick-up units $(m, n)^1$, $(m, n)^2$, $(m, n)^3$, $(m, n)^4$, $(m, n)^5$, $(m, n)^6$ of (m, n) block.

In this invention, pitches Dx, Dy of respective blocks are expressed as follows.

$Dx=dx·Px/Px', Dy=dy·Py/Py'.$

Moreover, C is the magnification of the lens, and dimensions dx, dy of respective image pick-up units are respectively expressed as dx=CPx' and dy=CPy'

The method of operation of this invention will now be described with reference to FIGS. 4A to 4F. Image pick-up operation starts from the state of FIG. 4A and ends in the state of FIG. 4F. FIGS. 4A–4F and FIG. 3 are shown in sequence to facilitate explanation of the principles of the invention.

Figure 4A:
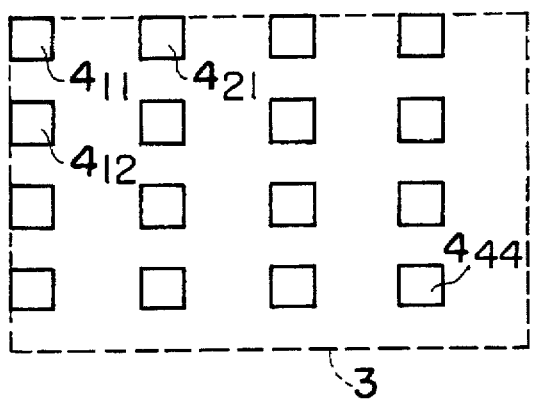
FIGS. 4A–4F are model views showing the operation of the imaging system shown in FIGS. 1 to 3.

Namely, initially, as shown in FIG. 4A, image pick-up of portions of image pick-up units $(1, 1), (1, 2)^1, . . . , (m, n)^1$ of respective blocks of the manuscript is carried out at respective pixels $4_{11}$, $4_{21}$, . . . , $4_{mn}$ of the area sensor 1 to output an image pick-up output.

Figure 4B:
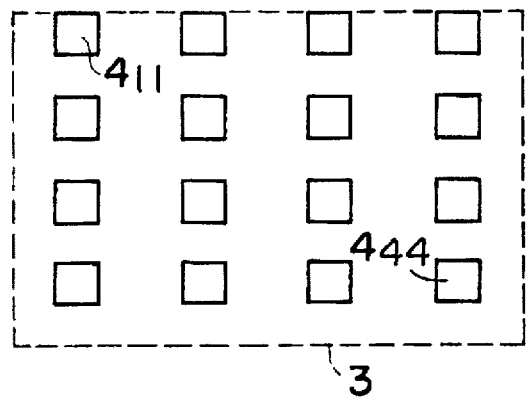

Then, as shown in FIG. 4B the manuscript 3 is shifted by the (dimension of) image pick-up unit dx in the X-direction to carry out image pick-up of the portions of image pick-up units $(1, 1)^2, (1, 2)^2, . . . , (m, n)^2$ to output an image pick-up output to the external.

Figure 4C:
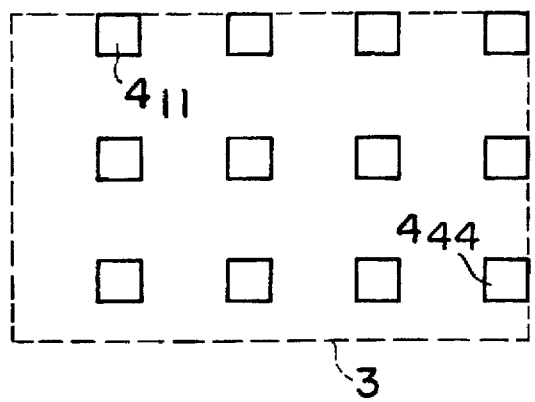
Figure 4D:
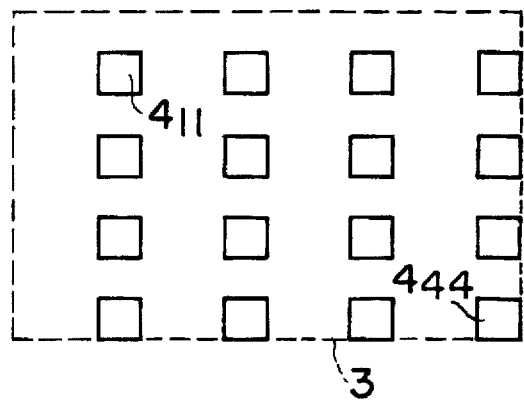
Figure 4E:
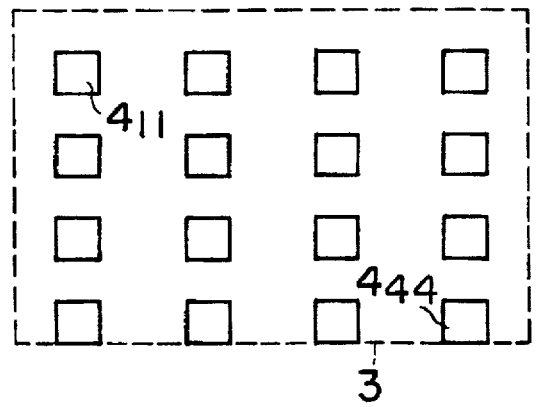
Figure 4F:
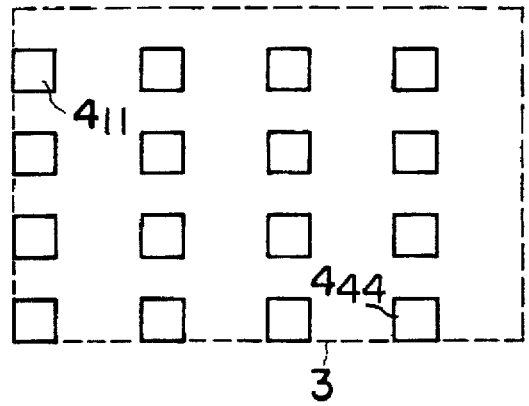

Then as shown in FIG. 4C, the manuscript 3 is shifted by the (dimension of) the image pick-up unit dx in the X-direction to carry out image pick-up of the portions of the image pick-up units $(1, 1)^9, (1, 2)^3, . . . , (m, n)^2$ to output an image pick-up output.

Thereafter, the manuscript 1 is shifted by the dy(dimension of) image pick-up unit in the Y-direction to carry out image pick-up of image pick-up units $(1, 1)^4, (1, 2)^4, . . . (m, n)^4$.

At times subsequent thereto, the manuscript 1 is shifted in order, thus to carry out image pick-up of image pick-up units $(1, 1)^5, (1, 2)^5, . . . , (m, n)^5$ to carry out for the last time, image pick-up of image pick-up units $(1, 1)^6, (1, 2)^6, . . . , (m, n)^6$ thereafter to return to the original position to carry out reading of the next manuscript in accordance with the same procedure.

As stated above, image pick-up patterns of six different portions are obtained with respect to one manuscript in the above-mentioned example. These image pick-up patterns are respectively put at corresponding positions in a large capacity memory of the image synthesizing section 6. When those patterns are reproduced, a fine image pick-up pattern of the original manuscript is obtained.

In accordance with this embodiment, even if a low cost area sensor having a small number of pixels on the order of 300,000–400,000 is used, fine picture comparable to one that is produced using a sensor having several times more pixels (six times in the foregoing description) than that of the area sensor can be obtained. Further, when the opening size of a pixel is reduced, a number of pixels about 10 times greater than that of the area sensor can be realized only by increasing the number of reading operations. In addition, since the pixel pitch is not changed, there is little possibility that the yield of the area sensor is lowered even if the opening size is reduced.

According to this embodiment, since the manuscript is caused to be moved, the movement pitch can be increased by magnification of the optical system of the pixel opening size. Ordinarily, the magnification C of the optical system for ⅓ inch area sensor becomes equal to a value of about 50. Even if the opening size is 1–2 μm, it is sufficient that the manuscript feed pitch is 50–100 μm. Using a stepping motor having a feed accuracy of about 1 μm sufficiently satisfies this purpose. Accordingly, accuracy can be sufficiently ensured even with a relatively low cost manuscript feeding mechanism.

Since the area sensor is used, the manuscript reading time can be reduced to a greater degree than the linear sensor. When the pixel area is assumed to be the same, the manuscript reading time can be reduced by the ratio of the number of pixels. Reduction in the reading time of about 1/100 can be realized.

As described above, in accordance with the imaging system of this invention, reduction of the manuscript reading time of about two figures is realized as compared to the linear sensor, improvement in resolution of about 1 figure is realized as compared to the area sensor used for movies, and reduction in cost of parts of about 2 figures is realized as compared to the sensor used for HDTV. Each image pick-up pattern of this invention has information of the entire area of the manuscript surface, although subjected to thinning. Accordingly, it is possible to grasp, in the beginning, the manuscript image comparable to the conventional imaging system shown in FIG. 5.

While it has been described that the image pick-up unit within the block is 3×2, it is determined by the pixel pitch and the size of pixel, and therefore can have an arbitrary value.

In addition, as the object, not only the manuscript but also a three-dimensional body (object) may be employed.

As described above, in accordance with this invention, an object feed control such that the number of pixels of the area sensor is seemingly increased is carried out. Accordingly, reading of the extremely fine object can be carried out in a short time.

What is claimed is:

1. An image system comprising:

an area sensor in which a plurality of pixels are two-dimensionally arranged so that a pixel pitch in an X direction is an integer multiple A of a pixel width and a pixel pitch in a Y direction is an integer multiple B of a pixel length;

object driving means for moving an object by said pixel width/length so that in a condition where one of said plurality of pixels corresponds to a part of an object, an image of a unit of 1/AB of the part of the object is formed on said one of said plurality of pixels; and photoelectric conversion control means for allowing the area sensor to carry out photoelectric conversion in a manner synchronized with movement of the object.

2. An imaging system according to claim 1, which further comprises an optical system for carrying out one of enlargement or contraction adapted to form said image of the unit of 1/AB of the part of the object on the pixel.

3. An imaging system according to claim 2, which further comprises a picture synthesizing means for AB numbered synthesizing image pick-up signals to obtain an image pick-up pattern of entirety of the object.

* * * * *